(12) United States Patent
Abdallah et al.

(10) Patent No.: US 11,590,616 B1
(45) Date of Patent: Feb. 28, 2023

(54) UNDERACTUATED JOINING SYSTEM FOR MOVING ASSEMBLY LINE

(71) Applicant: GM GLOBAL TECHNOLOGY OPERATIONS LLC, Detroit, MI (US)

(72) Inventors: Muhammad E. Abdallah, Farmington Hills, MI (US); James W. Wells, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 17/577,107

(22) Filed: Jan. 17, 2022

(51) Int. Cl.
*B25J 9/16* (2006.01)
*B23P 21/00* (2006.01)

(52) U.S. Cl.
CPC .................................. *B23P 21/004* (2013.01)

(58) Field of Classification Search
CPC ........ B25J 9/0018; B25J 9/046; B25J 9/0048; B25J 9/1055–1065; B25J 9/1687; B25J 9/1633; B25J 9/1653; B25J 9/1615; B25J 19/023; B25J 1/02; B25J 13/085; B25J 13/08–082; B25J 13/084–086; B25J 13/088; B23P 21/004
See application file for complete search history.

(56) References Cited

U.S. PATENT DOCUMENTS

| | | | |
|---|---|---|---|
| 10,583,557 B2 | 3/2020 | Abdallah et al. | |
| 10,626,963 B2 | 4/2020 | Abdallah et al. | |
| 10,759,634 B2 | 9/2020 | Abdallah et al. | |
| 2015/0239068 A1* | 8/2015 | Garcia | B23K 37/047 228/102 |
| 2016/0039093 A1 | 2/2016 | Abdallah et al. | |
| 2018/0079629 A1* | 3/2018 | Abdallah | B66C 13/48 |
| 2018/0370047 A1* | 12/2018 | Becciani | B25J 19/06 |
| 2020/0156245 A1 | 5/2020 | Abdallah et al. | |

* cited by examiner

*Primary Examiner* — Jun S Yoo
(74) *Attorney, Agent, or Firm* — Quinn IP Law

(57) ABSTRACT

An underactuated joining system for a moving assembly line includes a robot with actuated joints, an articulated compliance mechanism, and a controller. An end-effector of the mechanism is connected to linkages and to a joining tool, unactuated joints interconnect the linkages, and position sensors measure joint positions of the unactuated joints. In response to the joint positions, a controller regulates a position of the actuated joints to cause the compliance mechanism to compliantly follow the assembly line. This occurs while the tool remains engaged with a workpiece being transported along the assembly line. A method includes engaging the tool with the workpiece as the workpiece is transported by the assembly line, measuring joint positions of the unactuated joints using position sensors, and controlling a position of the active joints to cause the compliance mechanism to compliantly follow the workpiece along the assembly line.

11 Claims, 3 Drawing Sheets

UNDERACTUATED JOINING SYSTEM FOR MOVING ASSEMBLY LINE

INTRODUCTION

Automated manufacturing tasks often require performance of a joining operation on a workpiece. Traditionally, an operator would support an application-suitable joining tool while manually locating a target area on the workpiece, e.g., a rivet or fastener head, joint seam, or another area to be joined using the joining tool. Task loads are ordinarily experienced by the operator throughout the joining operation as the operator supports, positions, and operates the joining tool. As a result, various automation solutions have been adopted in the modern workplace to reduce operator task loads and improve manufacturing efficiency and throughput.

In an exemplary automotive manufacturing and assembly context, joining operations and other work tasks are performed with the assistance of automated assembly line equipment. For instance, a vehicle chassis may be transported through a manufacturing plant using an overhead or floor mounted conveyor system. At different workstations along the assembly line, one or more serial robots may perform various operations, many of which have been traditionally performed by human operators. Operators nevertheless remain involved in manufacturing and assembly processes, and may at times be required to interact with the workpiece. The collaborative nature of a modern assembly line is therefore ripe for improvements in the overall structure and functionality of the related assembly line equipment.

SUMMARY

Disclosed herein is an underactuated joining system operable for joining surfaces of a workpiece as the workpiece is transported through a manufacturing facility via a moving assembly line. The construction of the underactuated joining system ultimately allows the joining tool to follow along with the moving workpiece in a compliant or non-rigid manner. As used herein, "compliant", "compliance", and "compliantly" refer to the use of revolute, translational, or universal joints as flexible/non-rigid joints, or possibly other joint constructions such as spherical or parallelogram/quadrilateral joints, collectively enabling transmission of force and motion to enable the following actions described herein, particularly when connecting two rigid bodies in motion. This beneficial result occurs through the methodology described herein, which also accommodates direct "hands-on" physical human interaction with the joining tool or an end-effector connected to the joining tool.

For illustrative clarity, the workpiece is described herein as a singular item, but may encompass multiple workpieces or work surfaces in different embodiments. Likewise, the underactuated joining system is identified separately from the moving assembly line solely for illustrative clarity, with the underactuated joining system in an actual embodiment possibly including the overall collection of moving assembly line equipment, possibly including one or more robots. Additionally, an automotive assembly line as used throughout the disclosure is intended to be representative of just one possible implementation of the present teachings. In other words, the particular workpiece being operated on via the underactuated joining system described herein may vary within the scope of the present disclosure.

The underactuated joining system in a possible embodiment includes a robot, an articulated compliance mechanism, a joining tool coupled to an end-effector of the articulated compliance mechanism, and a controller in communication with the robot. The robot as contemplated herein may be optionally embodied as a multi-axis serial robot, such as but not limited to a 6-axis industrial robot, an overhead gantry, or an overhead powered rail system of the types well understood in the art. As such, the robot includes a plurality of actively-controlled/actuated joints, and therefore a corresponding plurality of active degrees of freedom (DOF).

In contrast to the robot, the articulated compliance mechanism has a plurality of passive/unactuated joints, with a set of position sensors collectively configured to measure joint positions of the unactuated joints and output the measured joint positions as electronic signals. At a minimum, one position sensor is used per DOF of the compliance mechanism. The joining tool, which is connected to the end-effector, is configured to form a joint on the workpiece as the workpiece is transported by the moving assembly line, with exemplary configurations of the joining tool including nut drivers, rivet guns, welding guns/torches, and the like. The controller in this particular embodiment is in communication with the position sensors of the articulated compliance mechanism. In response to the measured joint positions, and possibly a number, type, and/or configuration of the various unactuated joints relative to the actuated joints, the controller selectively controls a position of the active joints of the robot, e.g., a rotary position or articulation angle of constituent linkages joined by the active joints. This action causes the joining tool to engage the workpiece, such as by engagement of a tip of the exemplary nut driver with a fastener head, and to compliantly follow along with or track the moving assembly line.

More specifically, the control strategy disclosed herein may operate in one of two different modes as needed: (1) autonomous mode, and (2) a following mode. The autonomous mode enables the disclosed underactuated system to function without external physical input from an operator or workpiece/machine, while the following mode operates with at least some level of external input through physical contact with the operator or workpiece/machine, e.g., with the joining tool and/or the end-effector coupled thereto. As used herein, "following" refers to the responsive following action of the underactuated system as an external force or contact moves the joining tool disposed at the end-effector. The contact may be that of the operator or the machine (i.e., the moving assembly line).

Given external contact with the workpiece or operator, the robot may follow the motion of the end-effector. In response to a displacement in the articulated compliance mechanism, the controller commands a particular motion of the robot that works to close the displacement, and to thereafter maintain the articulated compliance mechanism in a center of its range of motion. This in turn causes the system to follow or track the moving line, once again in a non-rigid/compliant manner as noted above. The same principle allows the compliance mechanism to follow the human operator when the operator takes hold of the joining tool.

In some aspects of the disclosure, the articulated compliance mechanism is configured to return to an equilibrium position when the joining tool is not engaged with the workpiece. For instance, the articulated compliance mechanism may use gravity or a spring force as a restoring force.

The controller in one or more embodiments may be configured to close a displacement of the unactuated joints of the articulated compliance mechanism from a reference position. This action occurs in real time via control of the actuated joints of the robot, or more precisely through control of a corresponding joint actuator connected to the actuated joints.

An optional configuration of the underactuated joining system includes a machine vision system in communication with the controller. The machine vision system may generate a location signal indicative of the target area on the workpiece, e.g., a particular location of a weld or fastener joint to be formed by the joining tool. The controller in such an embodiment may automatically engage the joining tool with the workpiece in response to receipt of the location signal.

At least some of the unactuated joints may include a respective locking device configured to engage or lock in response to a locking signal. The controller in such an embodiment may be configured to selectively generate the locking signal to reduce a number of DOF of the underactuated joining system. For example, the locking signal may lock out one or more unactuated joints to establish a desired attitude or tilt angle of the joining tool relative to the workpiece.

Another aspect of the present disclosure includes one or more sensors configured to detect the presence of an operator within a predetermined proximity of the underactuated joining system. By using such human presence sensors, the controller may selectively arrest motion of the robot in response to detection of the operator within the predetermined proximity of the underactuated joining system.

Also disclosed herein is an associated method, an embodiment of which includes engaging the joining tool with the workpiece as the workpiece is transported by the moving assembly line. As noted above, the joining tool is connected to the articulated compliance mechanism having the unactuated joints, with the articulated compliance mechanism in turn being connected to the robot. The method may include measuring corresponding joint positions of each respective one of the unactuated joints using the position sensors.

In response to the corresponding joint positions, the controller selectively controls a position of the actuated joints of the robot, thereby causing the articulated compliance mechanism to compliantly follow the workpiece as the workpiece is transported by the moving assembly line. Embodiments of the present method may be optionally encoded as instructions on computer-readable media and executed by one or more processors of the controller or another suitable computer device to cause the processor to perform the above-summarized method.

A method in accordance with yet another embodiment includes connecting the articulated compliance mechanism to the robot, with the robot having a plurality of actuated joints, and with the compliance mechanism including a plurality of linkages interconnected by a plurality of unactuated joints. The method also includes connecting a joining tool to the articulated compliance mechanism. The joining tool in this particular implementation of the method is one of a nut driver, a welding gun, a welding torch, or a rivet gun. Additionally, the method includes engaging the joining tool with a vehicle body as the vehicle body is transported by a moving assembly line, and measuring corresponding joint positions of the unactuated joints using a set of position sensors, as the vehicle body is transported by a moving assembly line.

Then, in response to the corresponding joint positions, the controller selectively controls a position of the actuated joints, including closing a displacement of the unactuated joints of the articulated compliance mechanism in real time via control of the actuated joints of the robot. This action causes the articulated compliance mechanism to compliantly follow the workpiece as the workpiece is transported by the moving assembly line. The method further includes returning the articulated compliance mechanism to a predetermined equilibrium position when the joining tool disengages from the vehicle body.

The above features and advantages, and other features and advantages of the present disclosure, will be readily apparent from the following detailed description of the embodiment(s) and best mode(s) for carrying out the disclosure when taken in connection with the accompanying drawings and appended claims.

DETAILED DESCRIPTION

Figure 1:
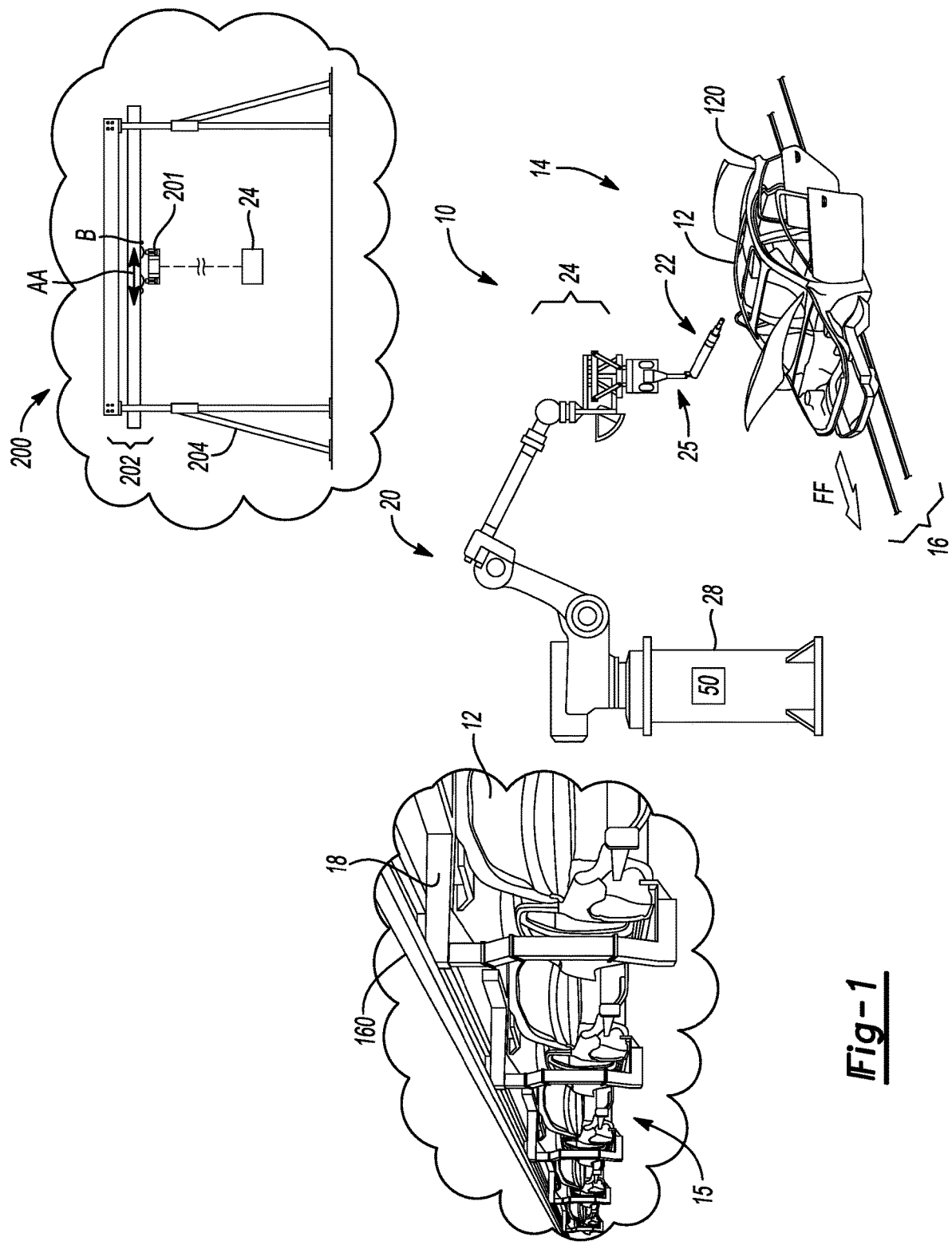
FIG. 1 is an illustration of an underactuated joining system usable with a moving assembly line, with the underactuated joining system being constructed as set forth herein.

Several embodiments of the present disclosure are illustrated in the accompanying drawings. The same or similar reference numerals are used in the drawings and the supporting description to refer to the same or similar structure. The drawings are provided in simplified form and, unless otherwise noted, are not to scale. For purposes of convenience and clarity, directional terms such as top, bottom, left, right, up, over, above, below, beneath, rear, and front, may be used with respect to the drawings. These and similar to directional terms are not to be construed to limit the scope of the disclosure.

The solutions provided herein are based in part on the principle of underactuation. As used herein, an underactuated robotic system entails the use of a serial mechanism in which an actively controlled robot is coupled in series with a passive/unactuated mechanism, with fewer than the total collective degrees of freedom (DOF) of the robotic system being actuated DOF. In the present construction, the articulated compliance mechanism includes linkages joined together via passive revolute and/or linear joints, with such joints being characterized by an absence of an associated joint actuator. Accordingly, the joints and DOF associated with the articulated compliance mechanism are referred to respectively herein as unactuated joints and unactuated DOF for clarity, as well as to distinguish the passively resulting motion of such joints with the commanded driven response of the robot's actuated joints. Additionally, the unactuated joints of the articulated compliance mechanism are considered redundant to the actuated joints of the robot, and are distally located with respect thereto.

Representative examples of suitable articulated compliance mechanisms usable within the scope of the present disclosure include, but are not limited to, those disclosed in U.S. patent application Ser. No. 16/773,388, "Redundant Underactuated Robot with Multi-Mode Control Framework", now published as US2020/0156245A1, U.S. Pat. No. 10,759,634, "Electromechanical System for Interaction with an Operator", which issued on Sep. 1, 2020, and U.S. Pat. No. 10,626,963, "Articulated Mechanism for Linear Compliance", which issued on Apr. 21, 2020, the contents of which are hereby incorporated by reference in their entireties. Other embodiments may be contemplated within the scope of the present disclosure.

Referring now to FIG. 1, an underactuated joining system 10 is configured for use with a workpiece 12 as the workpiece 12 is actively transported via a moving assembly line 14. The workpiece 12 in the non-limiting exemplary scenario illustrated in FIG. 1 is a surface of a vehicle body 120, such as a panel or support beam, or a component that is connected to the vehicle body 120. In the depicted embodiment, the vehicle body 120 is transported in the direction of arrow FF using assembly line equipment 15, e.g., via floor rails 16 or overhead rails 160 located respectively below or above the vehicle body 120. In the overhead configuration, the vehicle body 120 may be suspended via carriages 18 or other various other application-suitable conveyor equipment, as appreciated in the art. The particular workpiece 12 and the moving assembly line 14 may vary with the application, and therefore the configurations of FIG. 1 are intended to be representative and illustrative of the present teachings.

As the moving assembly line 14 transports the workpiece 12 through a facility, a robot 20 collocated with the moving assembly line 14 or integrated therewith performs a predetermined joining operation on the workpiece 12. The robot 20 may be variously embodied within the scope of the disclosure, including as the illustrated multi-axis industrial embodiment of the robot 20. Alternatively, the robot 20 may be configured as an overhead powered rail system 200, in which horizontal rails 202 are supported by vertical and/or angled beams 204, with a motor-driven cart 201 being translatable in the directions of arrows AA and B (orthogonal to the axis of beams 202) for two translational degrees of freedom. Depending on the end use, a joining tool 22 used for this purpose may be variously embodied as a nut runner, a weld gun, a rivet gun, etc. The envisioned joining process requires real time motion control and coordination of gross and fine movements of the robot 20 in response to motion of the workpiece 12. In that vein, the present disclosure provides hardware and software-based solutions for optimizing performance of the illustrated joining operation, whether as part of the representative automotive manufacturing process or as part of another operation in which the workpiece 12, embodied differently, is transported by the moving assembly line 14. Solely for illustrative consistency, the automotive manufacturing use case will be used hereinafter without limiting the present teachings to a particular embodiment of the workpiece 12, as noted above.

As appreciated in the art, machine vision capabilities are often used with moving assembly lines to facilitate part location, identification, tracking, and other functions. It is recognized herein, however, that once the joining tool 22 has engaged the workpiece 12, traditional vision systems are unable to accurately detect and report errors in relative motion. Additionally, engagement of the joining tool 22 with the workpiece 12 results in the connection of two rigid bodies, both of which are in motion: (1) the serial arrangement of the robot 20 and joining tool 22, and (2) the workpiece 12 engaged with the joining tool 22. Such a connection of rigid bodies, if motion is not perfectly synchronized, will result in relative motion and possible impingement, which in turn may require shutdown of the moving assembly line 14 or performance of other mitigating control action.

To that end, the underactuated joining system 10 of FIG. 1 includes an articulated compliance mechanism 24 connected to the robot 20, or to the alternative overhead powered rail system 200 or other suitable embodiment of the robot 20. Although shown schematically in FIG. 1 for simplicity, the articulated compliance mechanism 24 may be suspended from the cart 201 using various mechanisms, e.g., a tripod or parallelogram arrangement, as appreciated in the art. The joining tool 22 may be connected to the articulated compliance mechanism 24 via an end-effector 25, shown in FIGS. 1 and 2 as an exemplary extension road for grasping and supporting the joining tool 22. In operation, a controller 50, shown as part of a fixed or movable pedestal 28 of the robot 20 for simplicity but variously embodied as set forth below with reference to FIG. 2, corrects the above-noted relative motion and resulting position errors that would otherwise result from mutually engaged rigid bodies as the workpiece 12 is in motion.

Figure 2:
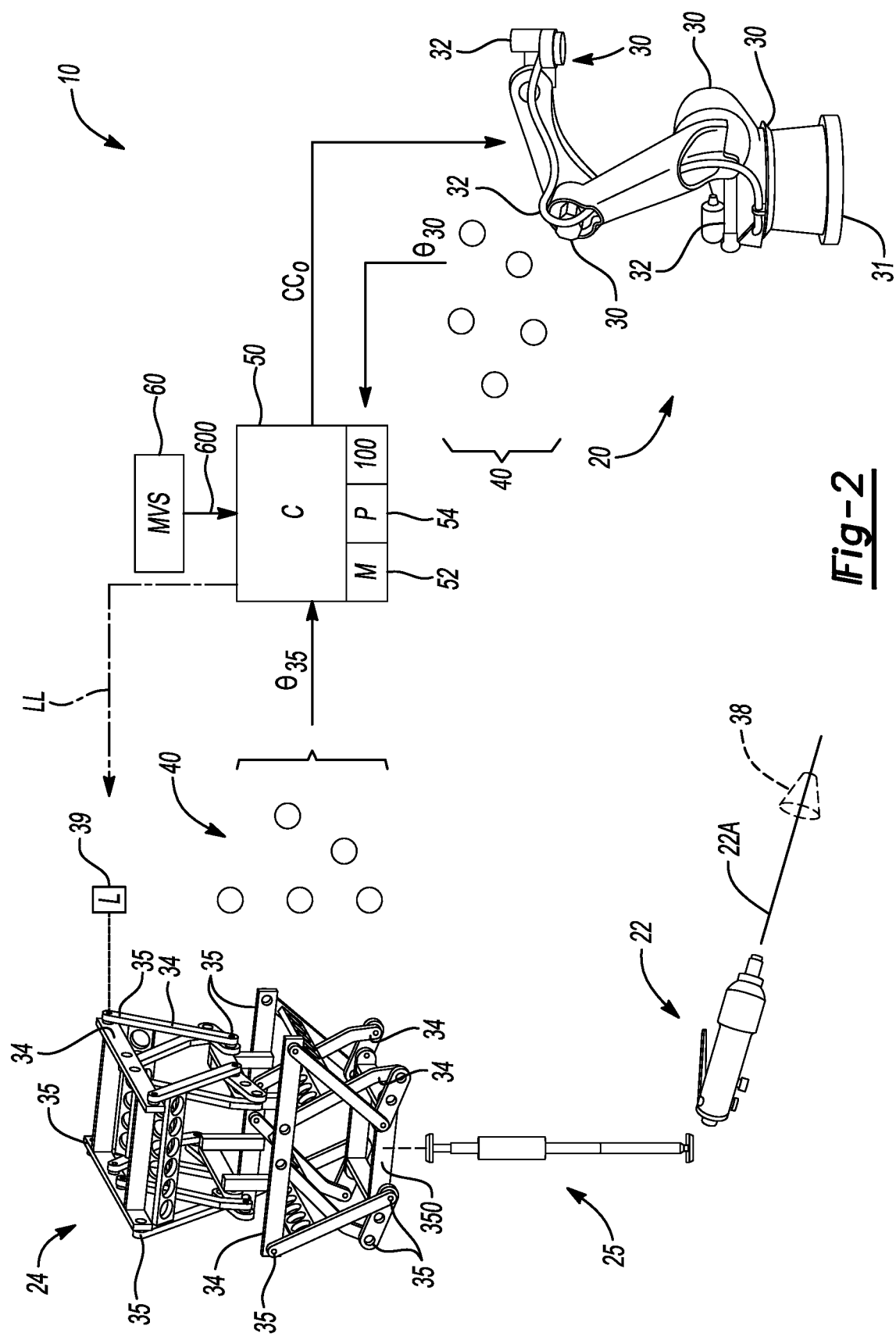
FIG. 2 is a schematic illustration of a representative embodiment of the underactuated joining system shown in FIG. 1.

By using the described programmed functionality of the controller 50, the joining tool 22 is able to automatically follow or track the workpiece 12 as the workpiece 12 is transported by the moving assembly line 14. The same functionality enables a human operator to selectively take control of the joining tool 22 on demand, e.g., when guiding the joining tool 22 to a bolt head, rivet head, weld joint/seam location, etc., with this guiding or locating action possibly assisted by a coarse locator device 38 as shown in FIG. 2. The coarse locator device 38 is defined herein as being a tool, fixture, or other physical component that serves to coarsely position the joining tool 22 within an approximate area of the particular point(s) to be operated on the workpiece 12. For instance, the coarse locator device 38 may be embodied as a funnel configured to direct the joining tool 22 to such a point or points on the workpiece 12, as appreciated in the art, with the funnel tapering toward such points. Other possible constructions of the locator device 38 may be envisioned within the scope of the disclosure, e.g., block guides, pegs, ramps, etc., and therefore the exemplary funnel is just one possible implementation. The present teachings thus allow for situational interaction of an operator with the articulated compliance mechanism 24 as needed, and to the extent permitted by other workplace restrictions such as access barriers preventing ingress of an operator into a particular portion of the range of motion of the robot 20.

Referring now to FIG. 2, the underactuated joining system 10, which is shown schematically and not to scale, includes the robot 20, the articulated compliance mechanism 24, and the controller (C) 50. The robot 20 as contemplated herein may be embodied as any application-suitable serial or other powered device having a plurality of actuated joints 30. Each respective one of the actuated joints 30 is powered by a corresponding joint actuator 32, such as an electric, hydraulic, or pneumatic rotary actuator or motor. The robot 20 in the non-limiting example implementation of FIG. 1 is as a multi-axis industrial robot having six or more actuated degrees of freedom (DOF), with the particular illustrated embodiment having a base 31 mounted proximate the moving assembly line 14, e.g., on the pedestal 28 of FIG. 1 or another suitable floor, wall, or ceiling-mounted support structure. Alternatively, the robot 20 may be embodied as the overhead powered rail system 200 of FIG. 1 as described above and appreciated in the art, or an overhead gantry, and powered using drive motors or a belt-driven or chain-driven drive mechanism. Thus, the particular construction of the robot 20 is not limited, provided the robot 20 is configured to provide the requisite actuated DOF as set forth herein.

The articulated compliance mechanism 24 is coupled to the robot 20 and includes multiple linkages 34, e.g., linear or curvilinear bar segments or beams, with the linkages 34 interconnected by a plurality of unactuated joints 35. Revolute, sliding, pivoting, and/or other motion about the unactuated joints 35 thus provides the articulated compliance mechanism 24 with unactuated DOF. The end-effector 25 may be connected to one or more of the multiple linkages 34, e.g., to a box carriage 350 as shown, and configured to connect to the joining tool 22 using clamps, fasteners, or other suitable means (not shown).

In some embodiments, at least some of the unactuated joints 35 may include a respective locking device (L) 39 configured to engage in response to a locking signal (arrow LL) from the controller 50. While a single locking device 39 is shown schematically in FIG. 2 for illustrative simplicity, those skilled in the art will appreciate that each unactuated joint 35 may include or may be connected to a corresponding locking device 39. Embodiments suitable for this purpose include clamps, calipers, friction brakes, locking pins, and the like, which in turn may be configured to engage adjacent structure of the articulated compliance mechanism 24 in a manner that arrests or limits motion of a given one of the unactuated joints 35. Receipt of the locking signal (arrow LL) by a given locking device 39 thus reduces a number of DOF of the underactuated joining system 10, in this instance by reducing the number of unactuated DOF of the articulated compliance mechanism 24.

As part of the disclosed solution, position sensors 40 are disposed in proximity to or on each one of the unactuated joints 35, with the position sensors 40 shown apart from the unactuated joints 35 in FIG. 2 solely for illustrative clarity. The position sensors 40, e.g., rotary encoders or other suitable sensor configurations, are configured to measure corresponding joint positions ($\theta_{35}$) of each respective one of the unactuated joints 35, and to output electronic signals indicative of the joint positions ($\theta_{35}$). A similar set of position sensors 40 may be used to measure joint positions ($\theta_{30}$) of the various actuated joints 30 of the robot 20, and to output electronic signals indicative of the measured joint positions ($\theta_{30}$). Thus, coordinated motion control of the actuated joints 30 and possible lock-out of one or more of the unactuated joints 35 as set forth below, ultimately affects the relative position of the joining tool 22 and the workpiece 12, including a tool orientation of the joining tool 22 about a tool axis 22A thereof.

Within the scope of the present disclosure, the controller 50, which is in communication with the position sensors 40 over wired or wireless pathways (not shown), is configured to respond to the collective set of joint positions 035 of the articulated compliance mechanism 24 by adjusting a respective position of each respective one of the actuated joints 30 as needed. This control action may occur, as specified elsewhere hereinabove, based in part on a number, type, and configuration of the unactuated joints 35 relative to the actuated joints 30. That is, a given range of motion may be available for a particular arrangement and configuration of the actuated joints 30, such that a less extensive and/or range-of-motion-capable set of unactuated joints 35 may require a different control response of the actuated joints 30 relative to a more extensive or capable set of the unactuated joints 35 shown in the various Figures. In this manner, the controller 50 causes the articulated compliance mechanism 24 to compliantly or non-rigidly follow the workpiece 12 while the joining tool 22 itself remains rigidly engaged therewith. The added compliance in the kinematic chain between the workpiece 12 and the robot 20 in turn addresses the above-stated problem of mutually-engaged rigid bodies in motion, where absent the present solutions the otherwise rigid connection of the joining tool 22 to the workpiece 12 may break or separate.

Although the controller 50 is depicted schematically as a unitary device in FIG. 2 for illustrative clarity and simplicity, implemented embodiments of the controller 50 may include multiple distributed digital computers each having memory (M) 52 and a processor (P) 54. The memory 52 includes sufficient amounts of tangible, non-transitory memory, e.g., read only memory, flash memory, optical and/or magnetic memory, electrically-programmable read only memory, and the like. The memory 52 also includes sufficient transient memory such as random access memory and electronic buffers. Hardware components of the controller 50 may include, among other things, a high-speed clock, analog-to-digital and digital-to-analog circuitry, and input/output circuitry and devices, as well as proper signal conditioning and buffer circuitry.

Embodiments of the underactuated joining system 10 include a machine vision system (MVS) 60, itself operable for detecting a predetermined pattern or feature of the workpiece 12 and outputting a location signal 600 descriptive of a position thereof. The controller 50 may thereafter use the location signal 600 to help locate an area of interest on the workpiece 12, such as a head of a threaded fastener or rivet. Collectively, the hardware and software configuration of the controller 50 and the peripheral equipment in communication therewith enables the processor 54 to execute computer-readable instructions embodying a method 100. Execution of the method 100 as set forth below ultimately causes the controller 50 to generate an electronic output signal (CCo), which is transmitted to the robot 20 to change one or more of the joint positions ($\theta_{30}$) thereof in real time, i.e., while the workpiece 12 of FIG. 1 is transported by the assembly line equipment 15.

Figure 3:
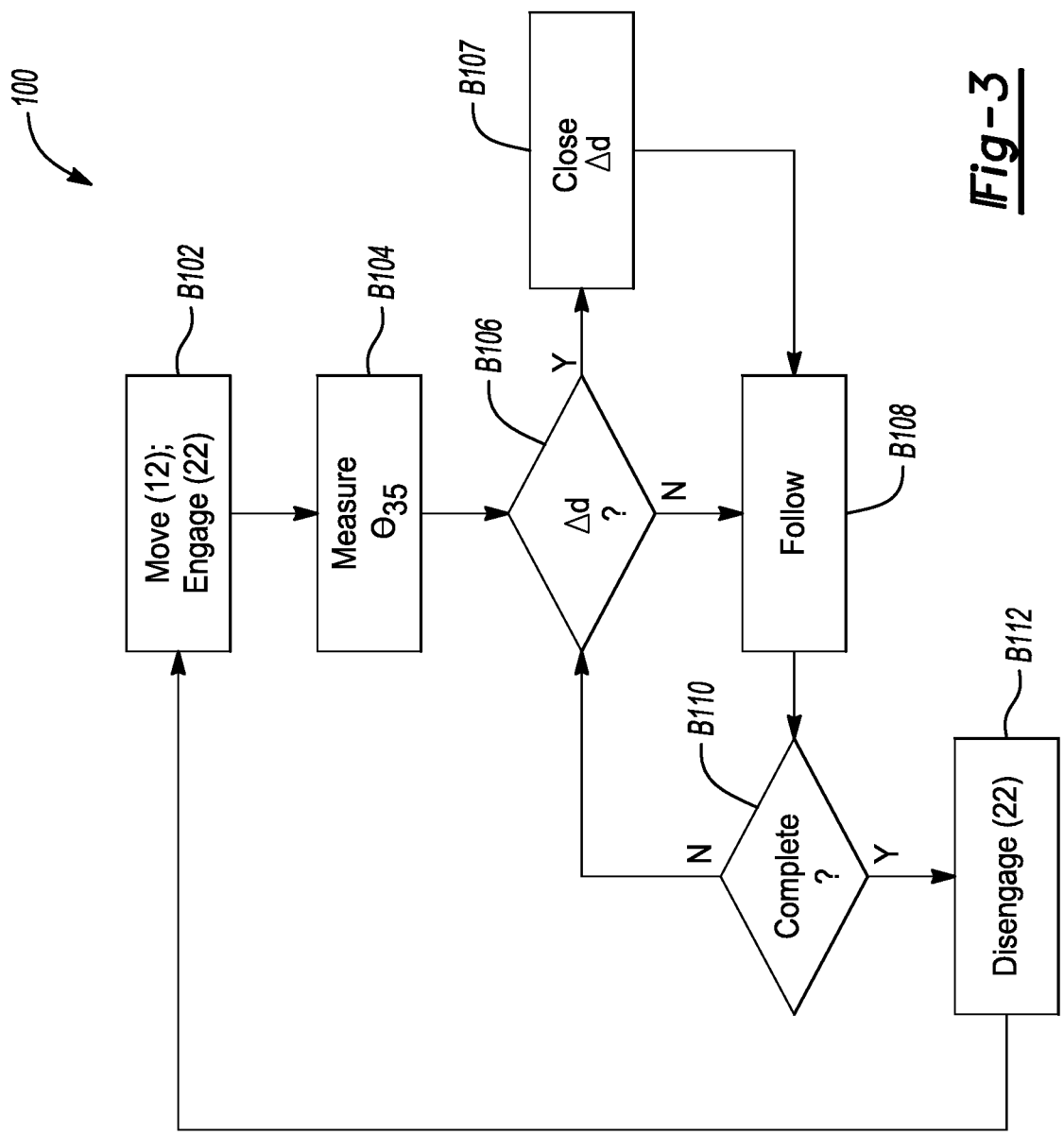
FIG. 3 is a flow chart describing an embodiment of a method for controlling the underactuated joining system of FIG. 1.

Referring to FIG. 3, an exemplary embodiment of the method 100 for performing an automated joining process using the underactuated joining system 10 of FIGS. 1 and 2 begins with block B102 ("Move (12); Engage (22)") with movement of the workpiece 12 via the moving assembly line 14 of FIG. 1. At a particular workstation or location along the path of the moving assembly line 14, the workpiece 12 will move into working proximity of the robot 20, which as disclosed above may be connected to the joining tool 22 of FIG. 2 via the end-effector 25 of the articulated compliance mechanism 24 described above.

After the workpiece 12 has moved into working proximity of the robot 20, i.e., to within a predetermined range of motion of the robot 20, the joining tool 22 is manually and/or machine-guided toward and engaged with the workpiece 12. In a possible implementation of block B102, a human operator interacting directly with the joining tool 22 or the end-effector 25 could manually urge the joining tool 22 into engagement with the workpiece 12. Alternatively, the machine vision system 60 of FIG. 2 may, using a resident camera and image processing/vision software, recognize a particular pattern, shape, size, or other identifying feature on the workpiece 12, as appreciated in the art.

During the performance of the method 100, the controller 50 of FIGS. 1 and 2 is able to selectively arrest motion of the robot 20. For example, the controller 50 may decide to arrest motion of the robot 20 in response to a detection of an operator within a predetermined proximity or range of motion of the underactuated joining system 10, e.g., using infrared or other human presence detectors, pressure mats, laser sensors, or other application-suitable sensory devices. Likewise, emergency stop options are still possible regardless of the possibility of the above-noted operator actions when interacting with the joining tool 22.

By way of an illustrative example, the machine vision system 60 could visually acquire two-dimensional or three-dimensional identifying features of a bolt head, localize the feature in a vision system coordinate system, translate the vision system coordinate system to a robot motion coordinate system used by the robot 20, and thereafter generate the location signal 600 of FIG. 2, with the location signal 600 being indicative of a location of the bolt head in this instance, or of another joint to be formed on the workpiece 12. The controller 50 may thereafter automatically engage the joining tool 22 with the workpiece 12 in response to the location signal 600, solely via control of the actuated joints 30 of the robot 20. As part of block B102, the optional coarse locator device 38 of FIG. 2 may be used to ease directing of the joining tool 22 to the location of the joint to be formed on the workpiece 12. The method 100 then continues to block B104 once the joining tool 22 has engaged the workpiece 12.

Block B104 ("Measure $\theta_{35}$") includes measuring, using the set of position sensors 40 described above, the corresponding joint positions ($\theta_{35}$) of the unactuated joints 35 of the articulated compliance mechanism 24. A representative example construction of the articulated compliance mechanism 24 is shown in FIG. 2, in the form of a passive parallelogram arrangement supplying two unactuated/passive DOF in the manipulation of the joining tool 22. Alternative constructions may be used to realize vertical rotational and/or translational DOF, or fewer or more rotational and/or horizontal DOF, and therefore the exemplary construction of FIG. 2 is just one possible implementation of the present teachings. The method 100 continues to block B106 when the joint positions (035) have been measured and reported to the controller 50.

Block B106 ("$\Delta d$?") of the method 100 includes calculating a displacement ($\Delta d$) of the various unactuated joints 35 of the articulated compliance mechanism 24, and by extension, of the various linkages 34 interconnected to one another by the unactuated joints 35. That is, the controller 50 is programmed with an expected orientation and position corresponding to a state in which the joining tool 22 is properly engaged with the workpiece 12. Displacement in this context thus refers to variation from the expected position and attitude.

Moreover, the expected orientation and position of the joining tool 22 may vary, e.g., when the controller 50 is tilting the joining tool 22 via operation of the locking device(s) 39 of FIG. 2, or otherwise maneuvering the joining tool 22 relative to the workpiece 12. Block B106, as with blocks B104, is performed in real time, with the displacement ($\Delta d$) calculated for a given workpiece 12 at a given workstation and then zeroed as the workpiece 12 is moved along the moving assembly line 14 to a downstream workstation upon completion of the joining operation. The method 100 then proceeds to block B107.

At block B107 ("Close $\Delta d$"), and in response to ongoing changes in the corresponding joint positions ($\theta_{35}$) indicative of the detected displacement ($\Delta d$) from block B106, the controller 50 may adjust the positions of the unactuated joints 35 indirectly by controlling the actuated joints 30 of the robot 20. The motions of the robot 20 in turn will close the displacement ($\Delta d$) by adjusting the positions of the various unactuated joints 35 of the articulated compliance mechanism 24. The method 100 then continues to block B108.

At block B108 ("Follow"), the controller 50 selectively controls a position of the active joints ($\theta_{30}$) to maintain zero displacement as closely as possible. This action causes the articulated compliance mechanism 24 to compliantly follow the workpiece 12 and the moving assembly line 14 as the workpiece 12 is transported by the moving assembly line 14. At the same time, the robot 20 forms a joint on the workpiece 12 using the joining tool 22, with this action occurring via operation of the controller 50 or a resident control module (not shown) of the robot 20. The method 100 then proceeds to block B110.

At block B110 ("Complete?"), the controller 50 determines if the joining process is complete. Various criteria may be used for this purpose depending on the nature of the particular joint being formed. For example, the controller 50 may confirm passage of a predetermined amount of joining time, torque levels, or other parameters, possibly but not necessarily confirmed by operation of the machine vision system 60 of FIG. 2. The method 100 repeats block B106 when the joining operation is still ongoing, and to block B112 in the alternative when the joining process is complete.

Block B112 ("Disengage") of FIG. 3 includes disengaging the joining tool 22 from the workpiece 12, once again via dynamic control of the robot 20 and its actuated joints 30, which in turn causes the joining tool 22 to pull back from the workpiece 12. As the now-completed workpiece 12 exits the workstation in which the robot 20 resides, the robot 20 may return to a default "ready" position in anticipation of the arrival of the next workpiece 12. The method 100 then returns to block B102.

As part of the method 100, the articulated compliance mechanism 24 of FIGS. 1 and 2 may be returned to a predetermined equilibrium position when the joining tool 22 is not engaged with the workpiece 12. For instance, the articulated compliance mechanism 24 may be configured to use gravity or a spring force as a restoring force. Such an equilibrium position may be realized using gravity alone as the restoring force in a possible embodiment, e.g., with the articulated compliance mechanism 24 centering itself at the equilibrium position solely as a result of gravitational forces on the various unactuated joints 35. Alternatively, a spring (not shown) may supply such a return force, or may assist gravity. Those skilled in the art will appreciate that the gravitational restoring force could be aided as needed, e.g., via springs or other resilient members (not shown) arranged on at least some of the linkages 34 of the articulated compliance mechanism 24.

Those skilled in the art, in view of the forgoing disclosure, will appreciate that other implementations of the method 100 may be envisioned within the scope of the disclosure. For example, an alternative method may include connecting the articulated compliance mechanism 24 to the robot 20 having the plurality of actuated joints 30, with the articulated compliance mechanism 24 described herein including the plurality of linkages 34 interconnected by the plurality of unactuated joints 35. The method may include connecting the joining tool 22 to the articulated compliance mechanism 24, engaging the joining tool 22 with the vehicle body 120 of FIG. 1 as the vehicle body 120 is transported by the moving assembly line 14, and measuring corresponding joint positions ($\theta_{35}$) of the unactuated joints 35 using a set of position sensors 40. This occurs as the vehicle body 120 is transported by the moving assembly line 14.

In such a method, and in response to the corresponding joint positions ($\theta_{35}$), the controller selectively controls a position of the actuated joints 30, which has the effect of closing a displacement of the unactuated joints 35 of the articulated compliance mechanism 24 in real time. This action in turn causes the articulated compliance mechanism 24 to compliantly follow the vehicle body 120 as the vehicle body 120 is transported by the moving assembly line 14. An embodiment of the method may include returning the articulated compliance mechanism 24 to a predetermined equilibrium position when the joining tool 22 disengages from the vehicle body 120.

The present teachings as described in detail above may be extended to various assembly lines and manufacturing processes requiring automated rigid body joining on a moving line, both with possible physical collaboration with human operators and in fully automated implementations. The disclosed solutions use compliant DOF with associated instrumentation and control algorithms in the realm of automated manufacturing or assembly to allow for completion of joining tasks in a compliant and reliable manner, thereby preventing damage to the robot 20 or the joining tool 22 during off-normal situations, possibly including emergency stops or when engaging the joining tool 22 with the workpiece 12. These and other attendant benefits of the present teachings will be readily appreciated by those skilled in the art in view of the foregoing disclosure.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims.

What is claimed is:

1. An underactuated joining system for use with a workpiece transported by a moving assembly line, comprising:
   a robot having a plurality of actuated joints;
   an articulated compliance mechanism coupled to the robot and having a range of motion, the articulated compliance mechanism including multiple linkages, an end-effector connected to the multiple linkages and configured to connect to a joining tool, a plurality of unactuated joints interconnecting the linkages, and one or more position sensors collectively configured to measure corresponding joint positions of the unactuated joints; and
   a controller in communication with the position sensors, wherein the controller is configured, in response to the corresponding joint positions, to selectively control a respective position of the actuated joints, and to thereby cause the articulated compliance mechanism to compliantly follow the workpiece as the workpiece is actively transported by the moving assembly line while the joining tool is engaged with the workpiece while the joining tool remains engaged therewith, such that mutually engaged rigid bodies are in motion, by:
   continuously determining a displacement in the articulated compliance mechanism as the workpiece is transported by the moving assembly line; and
   commanding a motion of the robot that closes the displacement and thereby maintains the articulated compliance mechanism in a center of the range of motion to thereby cause the underactuated joining system and the joining tool to compliantly follow or track the workpiece as the workpiece is transported by the moving assembly line.

2. The underactuated joining system of claim 1, further comprising the joining tool.

3. The underactuated joining system of claim 2, wherein the joining tool is one of a nut driver, a welding gun, a welding torch, or a rivet gun.

4. The underactuated joining system of claim 3, wherein the workpiece is a vehicle body operated on by the nut driver, the welding gun, the welding torch, or the rivet gun.

5. The underactuated joining system of claim 1, wherein the articulated compliance mechanism is configured to return to an equilibrium position when the joining tool is not engaged with the workpiece.

6. The underactuated joining system of claim 5, wherein the articulated compliance mechanism is configured to use gravity as a restoring force when returning the articulated compliance mechanism to the equilibrium position.

7. The underactuated joining system of claim 1, further comprising a machine vision system in communication with the controller, wherein the machine vision system is configured to generate a location signal indicative of a target area on the workpiece, and wherein the controller is configured to automatically engage the joining tool with the workpiece in response to the location signal.

8. The underactuated joining system of claim 1, wherein at least some of the unactuated joints include a respective locking device configured to engage in response to a locking signal, and wherein the controller is configured to selectively generate the locking signal to thereby reduce a number of degrees of freedom of the underactuated joining system.

9. The underactuated joining system of claim 8, wherein the locking signal is configured to change an attitude or tilt angle of the joining tool relative to the workpiece.

10. The underactuated joining system of claim 1, further comprising one or more sensors configured to detect an operator within a predetermined proximity of the underactuated joining system, wherein the controller is configured to selectively arrest motion of the robot in response to detection of the operator within the predetermined proximity of the underactuated joining system.

11. The underactuated joining system of claim 1, further comprising the moving assembly line.

* * * * *